United States Patent
Jain et al.

(10) Patent No.: US 7,983,680 B2
(45) Date of Patent: Jul. 19, 2011

(54) SYSTEM AND METHOD FOR CONVERGED NETWORK SERVICES

(75) Inventors: Praduman D. Jain, Fairfax, VA (US); Sanjay Khurana, Oakton, VA (US); Ali R. Tabassi, Great Falls, VA (US); Greg Homan, Dallas, TX (US); Becki J. Last, Washington, DC (US)

(73) Assignee: Nextel Communications Inc., Reston, VA (US)

( * ) Notice: Subject to any disclaimer, the term of this patent is extended or adjusted under 35 U.S.C. 154(b) by 766 days.

(21) Appl. No.: 11/199,995

(22) Filed: Aug. 10, 2005

(65) Prior Publication Data
US 2007/0036098 A1   Feb. 15, 2007

(51) Int. Cl.
*H04W 40/00* (2009.01)
(52) U.S. Cl. ......... 455/445; 455/417; 455/521; 379/273
(58) Field of Classification Search .................. 455/445, 455/417, 521; 379/273
See application file for complete search history.

(56) References Cited

U.S. PATENT DOCUMENTS

| | | | | |
|---|---|---|---|---|
| 4,560,837 A * | 12/1985 | Carson et al. | ............ | 379/212.01 |
| 5,548,636 A * | 8/1996 | Bannister et al. | ........ | 379/390.01 |
| 5,712,903 A * | 1/1998 | Bartholomew et al. | .... | 379/88.25 |
| 5,715,296 A * | 2/1998 | Schornack et al. | ........... | 455/403 |
| 5,966,660 A * | 10/1999 | Jonsson | ........................ | 455/445 |
| 6,192,231 B1 * | 2/2001 | Chapman et al. | ............. | 455/401 |
| 6,421,324 B1 * | 7/2002 | Boyle et al. | .................... | 370/261 |
| 6,687,359 B1 * | 2/2004 | D'Arcy et al. | ........... | 379/209.01 |
| 6,853,718 B1 * | 2/2005 | Bedingfield et al. | ...... | 379/212.01 |
| 6,865,173 B1 * | 3/2005 | Czaja et al. | .................... | 370/342 |
| 7,010,002 B2 * | 3/2006 | Chow et al. | .................... | 370/485 |
| 7,061,896 B2 * | 6/2006 | Jabbari et al. | ................. | 370/338 |
| 7,096,043 B1 * | 8/2006 | Sylvain | ......................... | 455/565 |
| 7,116,972 B1 * | 10/2006 | Zhang et al. | ............... | 455/414.1 |
| 7,218,721 B1 * | 5/2007 | Vincent et al. | ........... | 379/220.01 |
| 7,424,008 B2 * | 9/2008 | Thermond | .................... | 370/352 |
| 2001/0046215 A1 * | 11/2001 | Kim | .............................. | 370/329 |
| 2005/0100152 A1 * | 5/2005 | Pearson | ................... | 379/207.16 |
| 2005/0195802 A1 * | 9/2005 | Klein et al. | .................... | 370/352 |
| 2006/0160565 A1 | 7/2006 | Singh et al. | | |

* cited by examiner

*Primary Examiner* — Nghi H Ly

(57) ABSTRACT

Systems and methods for providing services for stations supported by a residential gateway are provided. The residential gateway can support one or more fixed-line station and/or one or more mobile stations. The mobile stations can be supported by a wireless macro network and/or the residential gateway. Services such as simultaneous ringing, distinctive ringing, call transfer, extension functionality, and the like can be provided for the mobile station and the fixed-line station.

8 Claims, 9 Drawing Sheets

SYSTEM AND METHOD FOR CONVERGED NETWORK SERVICES

BACKGROUND OF THE INVENTION

Recent technology advances have expanded consumer options for obtaining telecommunications services. Whereas telecommunications have typically been provided via a public switch telephone network (PSTN), consumers can now obtain telecommunications services from wireless network operators and from broadband network service providers. However, landline telecommunication services, including PSTN-supported or broadband-supported services, are not integrated with wireless communication services. Accordingly, consumers typically subscribe to both landline and wireless communication services.

The lack of integration of landline and wireless communication services can be troublesome for consumers. For example, in order to reach a consumer a caller may have to call the consumer's landline and wireless telephone numbers. Additionally, while the consumer is located within their residence and they receive a call on their wireless device (herein referred to as mobile station), the consumer will be charged per-minute for the air-time of the call, even though they would not be charged per-minute for such time if they received the call on their land-line station.

Accordingly, it would be desirable to provide systems and methods that integrate landline and wireless communications.

SUMMARY OF THE INVENTION

In accordance with exemplary embodiments of the present invention, services that are typically provided between a number of fixed-line stations in the PSTN are provided between a mobile station and a fixed-line station. In accordance with exemplary embodiments of the present invention, the fixed-line station is coupled to a gateway, which in turn is coupled to a broadband network service provider. The broadband network service provider can provide voice communication services to the fixed-line station via the broadband network. The gateway can support wireless communications with the mobile station, in such a way that, when located in an area supported by the gateway, the mobile station's communications will be routed through the broadband network.

In accordance with exemplary embodiments of the present invention, telecommunication services, including simultaneous ringing, distinctive ringing, call transfer, extension functionality, and the like can be provided for the mobile station and the fixed-line station.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
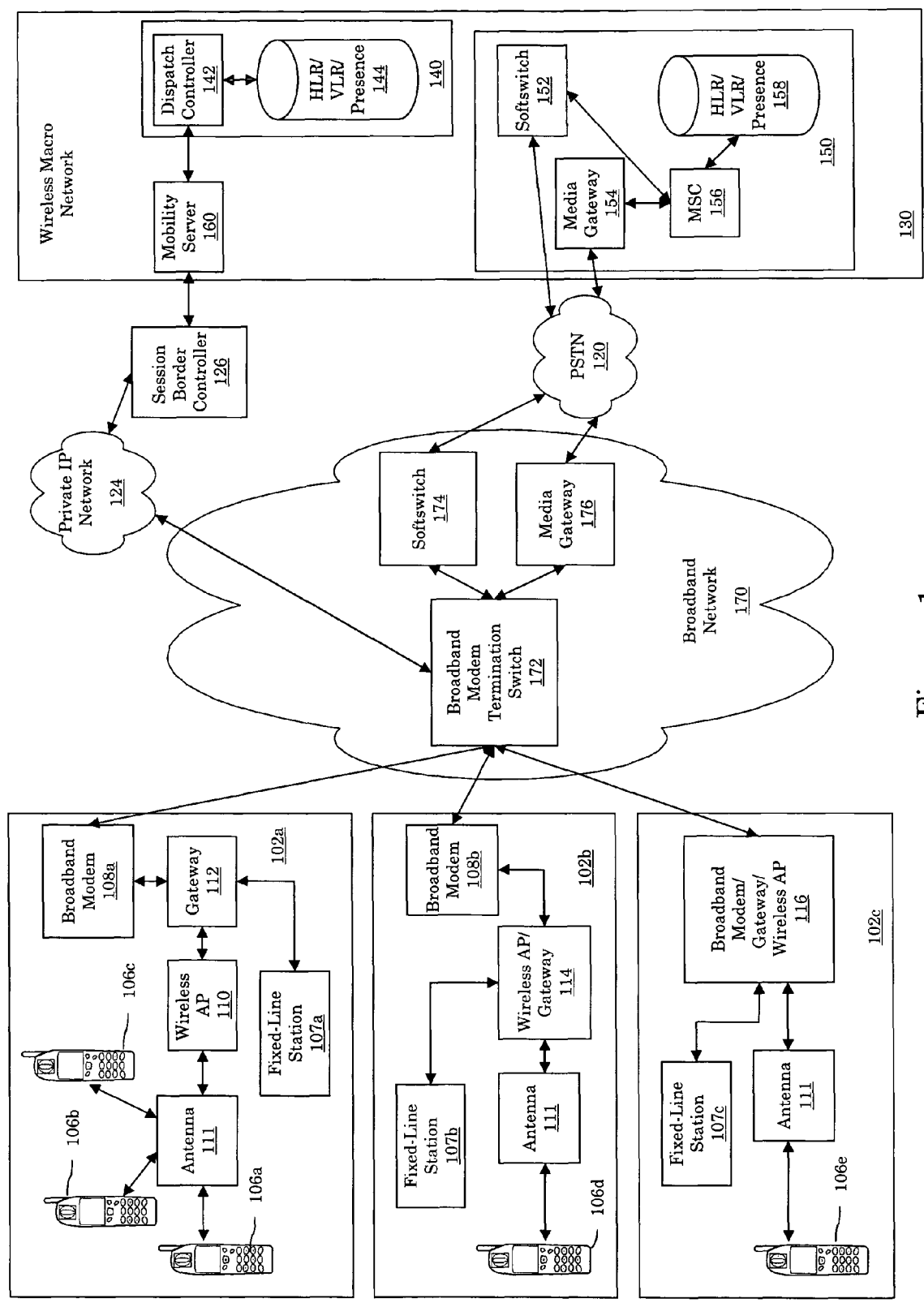
FIG. 1 illustrates a block diagram of an exemplary communication system in accordance with the present invention.

FIG. 1 illustrates a block diagram of an exemplary communication system in accordance with the present invention. The communication system includes a number of residences 102a-102c. Each residence includes one or more mobile stations 106a-106e. When the mobile stations 106a-106e are in a coverage area of the wireless macro network 130, they operate using the signaling and protocols of the wireless macro network 130. Additionally, one or more of the mobile stations 106a-106e can be dual-mode mobile stations that operate according to a short-range wireless networking protocol when communicating with a gateway located in the residence, such as 802.11 or Bluetooth protocols, and wireless macro network protocols. Accordingly, a subscriber can carry the mobile station away from the residence and use it on the wireless macro network 130. As used herein the term mobile station is intended to cover conventional wireless telephones, wireless computers, wireless personal digital assistants (PDAs), and the like. Each residence can also include a fixed-line telephone 107a-107c, which can be a conventional analog telephone, ISDN digital telephone, Voice over IP (VoIP) telephone, and/or the like.

Each residence includes components for connecting the mobile stations and fixed-line stations to PSTN 120 and wireless macro network 130 in order to allow communications between the mobile stations 106a-106e and fixed-line stations 107a-107c and communication stations supported by the PSTN 120 and/or the wireless macro network 130. These components can include a broadband modem 108a, gateway 112, wireless access point 110 and antenna 111. The functions of these individual components can be combined. For example, in residence 102b the wireless access point and gateway are combined into a single component 114, and in residence 102c the broadband modem, gateway and wireless access point are combined into a single component 116. The broadband modem portion of element 108 can be any type of conventional broadband modem such as a cable modem compliant with DOCSIS standard or a digital subscriber line (DSL) modem compliant with the G.lite standard. Alternatively, or additionally, wireless broadband connections, such as satellite or metropolitan area networks (e.g., WiMax networks), can be used. The particular type of broadband modem will depend upon the type of technology employed by the broadband network 170.

The gateway 112, or the corresponding function in a combined device (e.g., device 114 or 116), can be a conventional media terminal adapter (MTA) used for providing voice communications to the residence. Specifically, the gateway 112 exchanges voice and signaling information with the broadband modem termination switch 172 of the broadband network 170. For interconnect voice communications, the broadband modem termination switch 172 exchanges signaling information with softswitch 174, and voice information with media gateway 176. The softswitch 174 and media gateway 176 route the interconnect voice communications to the PSTN 120. If the destination of the voice communications is supported by the wireless macro network 130, the PSTN can then route the voice communications to the wireless macro network 130.

The wireless access point provides RF signals for communication with the mobile stations 106a-106e. In addition to supporting fixed-line stations 107a-107c, the gateway 112 acts as a base transceiver station (BTS) and converts the signals received from the mobile station 106a into an appropriate format for transmission through the broadband network 170 to the wireless macro network 130 or PSTN 120. For ease of explanation, and not limitation, the provision of wireless communications within a particular residence by a access point/gateway will be referred to as a private wireless network.

Dispatch communications which originate from mobile stations 106a-e are routed through the broadband modem termination switch 172 of the broadband network 170 to the wireless macro network 130 via a private IP network 124 and a session border controller 126. The use of a private IP network 124 depends upon implementation, and may be omitted. Although illustrated outside of the wireless macro network 130, the private IP network 124 and the session border controller 126 can be part of the wireless macro network 130. The private IP network 124 is a transmission medium for dispatch communications between the residences 102a-c and the wireless macro network 130 and operates in a conventional manner. The session border controller 126 acts as a firewall to protect the wireless macro network 130 from unauthorized access.

For purposes of explanation, and not limitation, the illustrated wireless macro network 130 is based upon an iDEN communications system such as that owned and operated by Nextel Communications, Inc. of Reston, Va. However, the wireless macro network 130 can be any type of wireless macro network operated by any service provider. The wireless macro network 130 includes a dispatch portion 140 and an interconnect portion 150. Dispatch communications are commonly known as a walkie-talkie or push-to-talk type of communications such as Nextel's service identified by the trade name Direct Connect. Interconnect communication is what is conventionally considered "cellular communications". For a number of reasons which are not relevant to the present application, dispatch calls are handled differently by the network than interconnect calls.

The dispatch portion 140 includes a dispatch controller 142 which operates in a conventional manner to control dispatch communications. The dispatch portion also includes a home location register (HLR)/visitor location register (VLR)/Presence server 144, which operates in a conventional manner for tracking the location, i.e., the point of attachment to the network, of mobile stations based on mobile station registration messages. FIG. 1 illustrates the HLR/VLR/Presence server as a single network element for ease of explanation, and not limitation. The HLR, VLR and Presence server can be provided as separate network elements.

The interconnect portion 150 includes a softswitch 152, media gateway 154, mobile switching center (MSC) 156 and HLR/VLR/Presence server 158. HLR/VLR/Presence server 158 is illustrated as a single network element for ease of explanation, and not limitation. Accordingly, the HLR, VLR and Presence server functionality can be provided as separate network elements. The softswitch 152 operates as a conventional softswitch by switching call related signaling between various endpoints, e.g., calls to and from the public switched telephone network (PSTN) 120. The media gateway 154 operates as a conventional media gateway by switching call data, such as voice data, and performing any necessary signaling and protocol conversion. The media gateway 154 can include voice coders ("vocoders") for changing voice coding from the pulse code modulation (PCM) used in the PSTN 120 to an appropriate voice coding used by the wireless macro network, such as the vector sum excited linear predictive (VSELP) coder used in iDEN networks. The MSC operates in a conventional manner to switch communications between various BTSs, and the VLR/Presence server acts in a conventional manner as described above.

The mobility server 160 routes all dispatch communications which originate from the private wireless networks 102a-102c. Specifically, the mobility server 160 routes all communications between the wireless macro network and the private wireless networks 102.

Although not illustrated, the mobile stations 106a-e can use the private wireless networks for data communication. For example, the mobile station may subscribe to a particular type of data communication application through the wireless macro network. In this case the application would only work properly when it is routed through the wireless macro network. Accordingly, even though the data communication could occur through the broadband network 170 itself, the wireless macro network may format the data appropriately for the mobile device, and hence, use of the wireless macro network for this purpose is desired.

Conventional broadband networks provide voice communications for fixed-line stations using gateways. However, these gateways typically do not support mobile stations that operate on wireless macro networks. When supported by the gateway at the residence, the mobile station can receive a call using the same telephone number as used in the wireless macro network. However, because the mobile station is located in the residence, it would be desirable to provide services that are typically provided only between fixed-line telephone located in the same residence. Accordingly, the present invention provides systems and methods for providing such services when a gateway supports both a fixed-line station and a mobile station, which can operate on a wireless macro network.

In accordance with exemplary embodiments of the present invention, when a subscriber desires calls to be handled by a particular service, the subscriber will activate the service. The service can be activated by accessing a web page, dialing a interactive voice response system, entering a service code, with a telephone representative of the broadband network service provider and/or the like. Once the service has been activated, the broadband wireless network operator's subscriber database is updated to identify that this subscriber has activated the particular service. Accordingly, when particular events occur, the broadband network service provider can invoke the particular service for the subscriber.

Figure 2A:
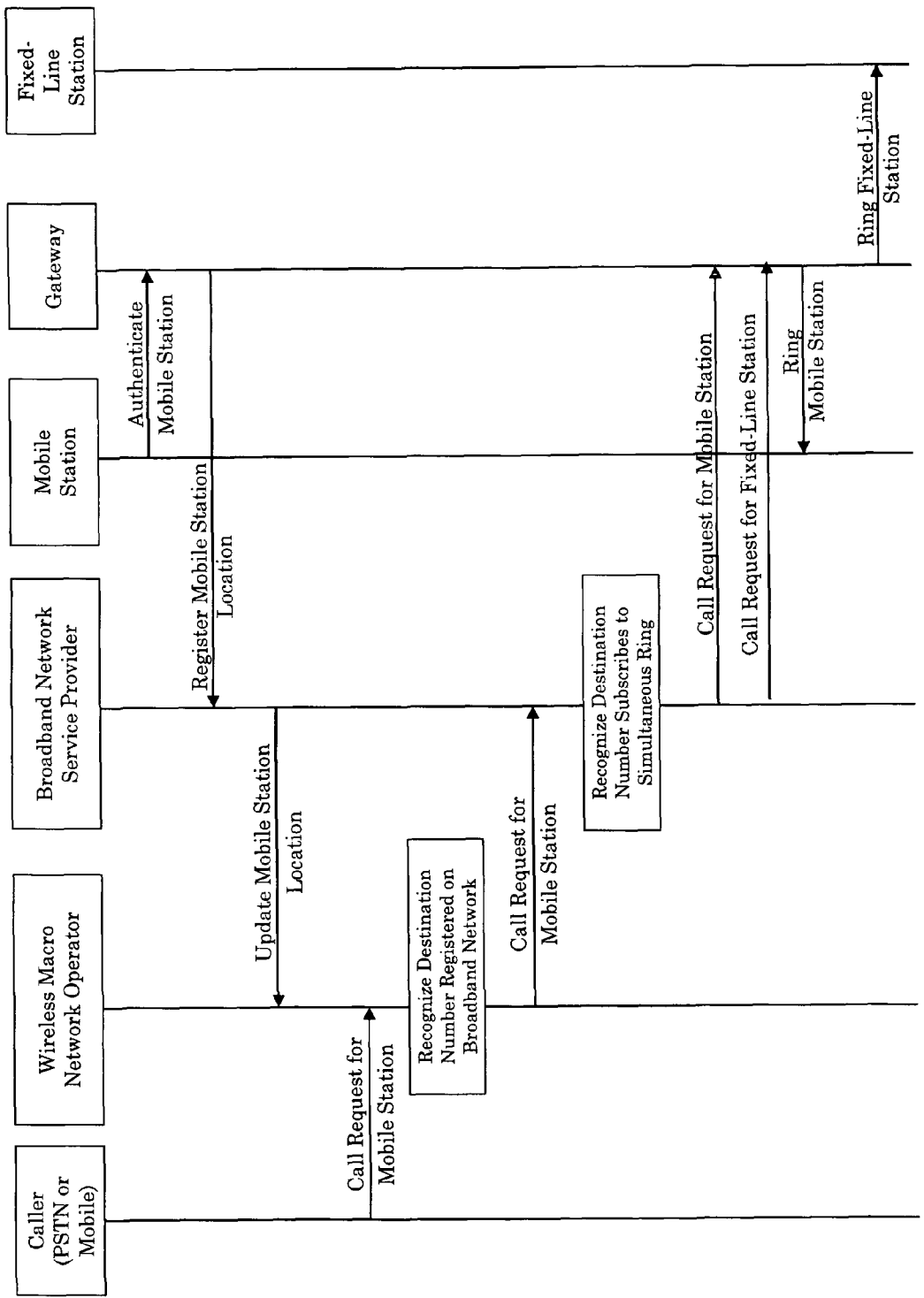
FIGS. 2a-2c illustrate exemplary signaling diagrams of methods of simultaneous ringing of a fixed-line station and a mobile station in accordance with the present invention.
Figure 2B:
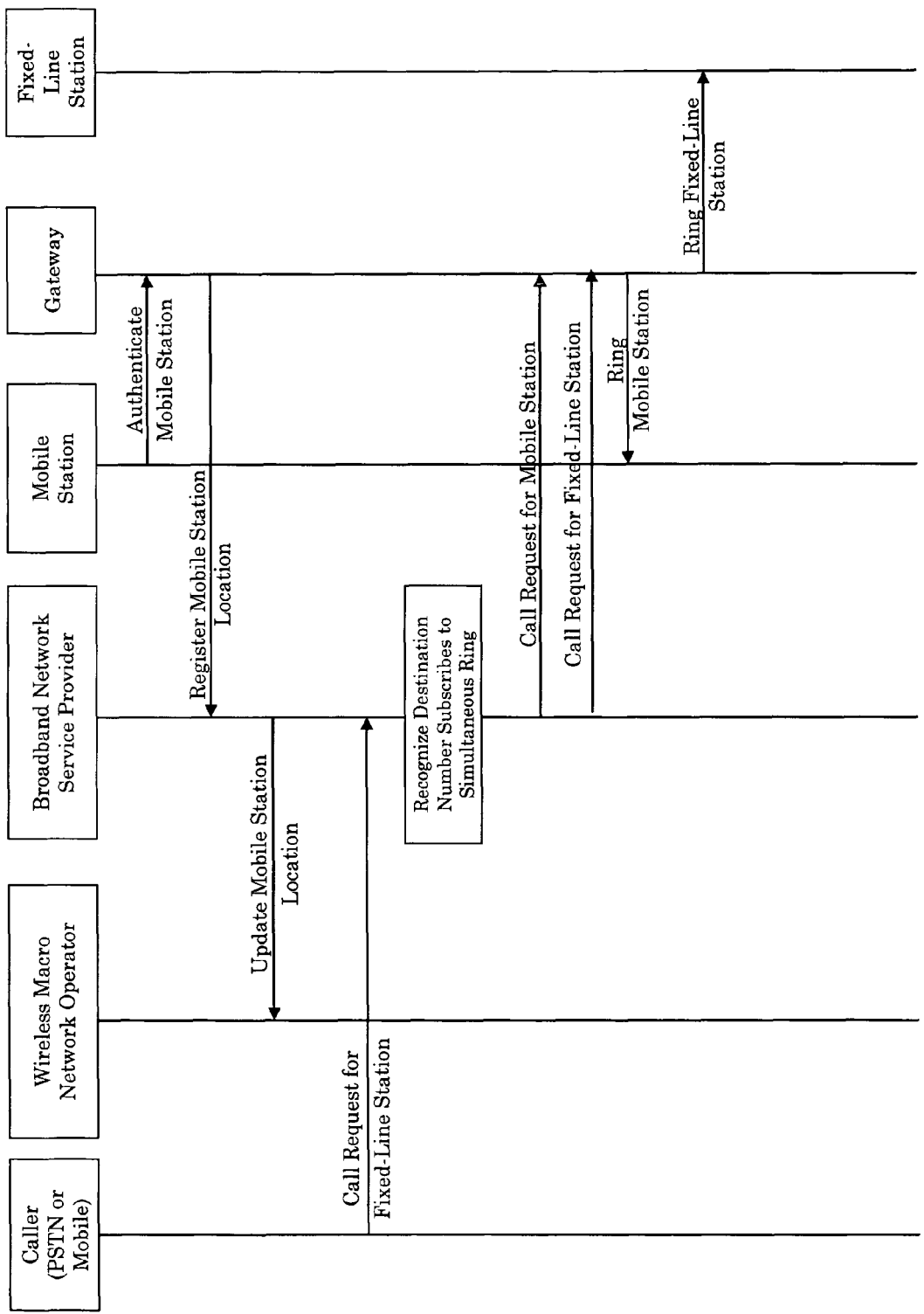
Figure 2C:
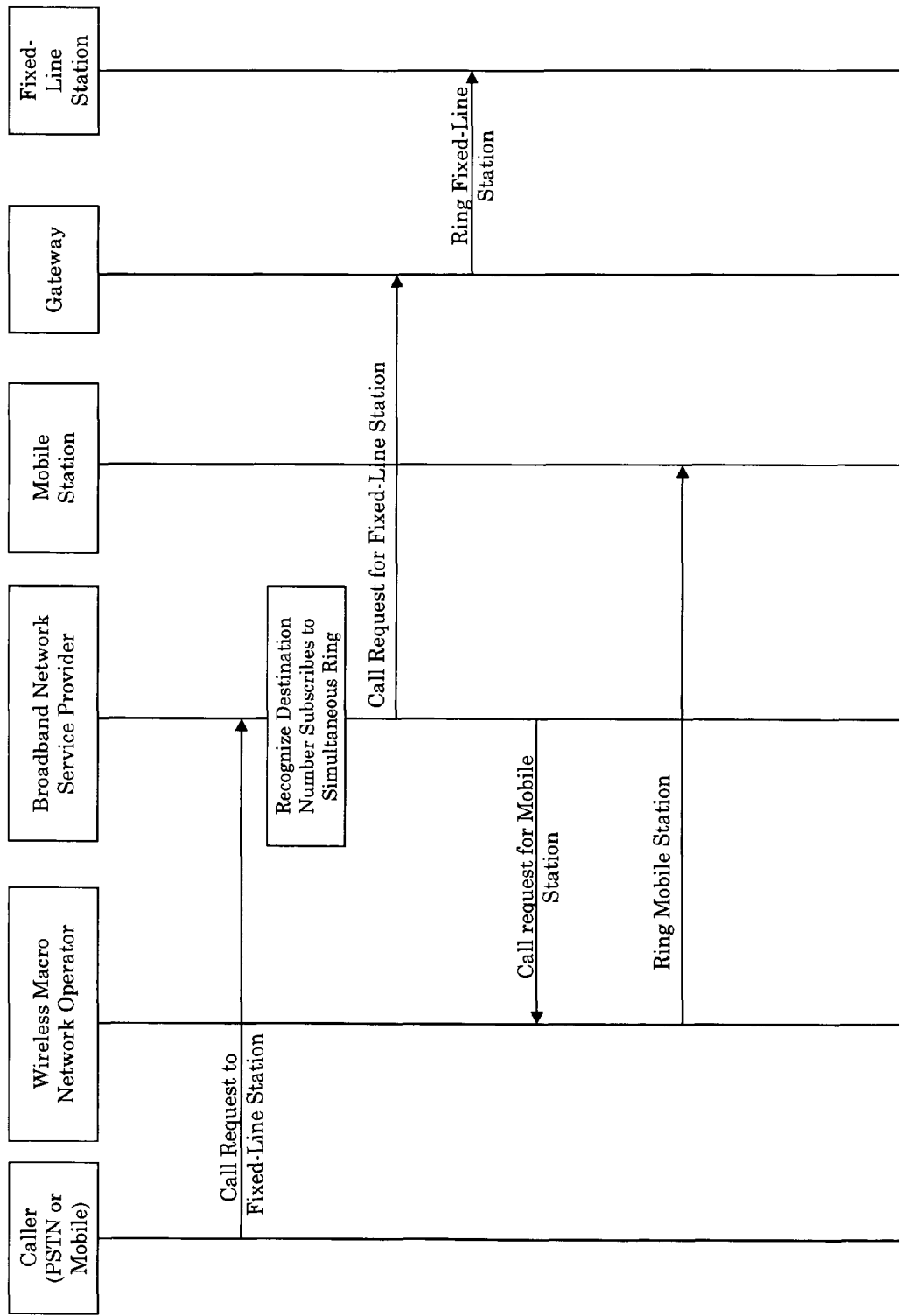

One service that would be desirable is simultaneous ringing. FIGS. 2a-2c illustrate exemplary signaling diagrams of methods of simultaneous ringing of a fixed-line station and a mobile station in accordance with the present invention. FIG. 2a illustrates an exemplary signaling diagram of a method of simultaneous ringing of a fixed-line station and a mobile station for a call request directed to the mobile station in accordance with the present invention. When a mobile station enters the gateway's wireless coverage area, the mobile station authenticates itself with the gateway. The gateway then register's the mobile station's location with the broadband network service provider, which then performs a location update procedure with the wireless network operator. The mobile station is now registered as being supported by the gateway, and all incoming calls which are received by the wireless macro network operator for the mobile station will be directed to the broadband network service provider, which in turn directs the calls to the gateway.

In the example illustrated in FIG. 2a, when the incoming call request is directed to the mobile station, the wireless macro network operator recognizes that the mobile station's current location is at the gateway and forwards the call request to the broadband network service provider. When the broadband network service provider receives the call request, a service database is accessed, which is used to determine that the mobile station subscribes to simultaneous ring service. Accordingly, the broadband network service provider sends two call requests to the gateway, one addressed to the mobile station and a second addressed to the fixed-line station. The gateway then rings both the mobile station and the fixed-line station. Although not illustrated, when either the mobile station or the fixed-line station goes "off-hook" (i.e., answers the call), the gateway forwards this indication to the broadband network service provider, which terminates the ringing of the station that did not answer the call.

FIG. 2b illustrates exemplary signaling of a method for simultaneous ringing where the incoming call request is directed to the fixed-line station. When the broadband network service provider receives an incoming call request directed to the fixed-line station, a service database is accessed, which is used to determine that the mobile station subscribes to simultaneous ring service. Accordingly, the broadband network service provider sends two call requests to the gateway, one addressed to the mobile station and a second addressed to the fixed-line station. The gateway then rings both the mobile station and the fixed-line station. Although not illustrated, when either the mobile station or the fixed-line station goes "off-hook" (i.e., answers the call), the gateway forwards this indication to the broadband network service provider, which terminates the ringing of the station that did not answer the call.

FIG. 2c illustrates exemplary signaling of a method for simultaneous ringing where the incoming call request is directed to the fixed-line station, and the mobile station is located in the wireless macro network's coverage area and is supported by the wireless macro network. When the broadband network service provider receives an incoming call request directed to the fixed-line station, a service database is accessed, which is used to determine that the mobile station subscribes to simultaneous ring service. Accordingly, the broadband network service provider sends a call request for the mobile station to the wireless macro network operator and a call request for the fixed-line station to the gateway. The gateway then rings the fixed-line station, and the wireless macro network operator rings the mobile station. Although not illustrated, when the fixed-line station goes "off-hook" (i.e., answers the call), the gateway forwards this indication to the broadband network service provider, which terminates the ringing of the mobile station by forwarding a call termination message to the wireless macro network operator. Similarly, when the mobile station goes "off-hook", the wireless macro network operator forwards this indication to the broadband network service provider, which terminates ringing by sending a call termination message to the gateway.

Another service that can be provided in accordance with the present invention is a distinctive ringing service. The distinctive ringing service can provide a different type of ring to the mobile station when it receives a call that was originally directed to the fixed-line station, but due to the simultaneous ringing service is also sent to the mobile station. Similarly, the distinctive ringing service can provide a different type of ring to the fixed-line station when it receives a call that was originally directed to the mobile station, but due to the simultaneous ringing service is also sent to the fixed-line station. The distinctive ringing service can be provided by including an indicator in the call request indicating that the station should use a different ring than is used for calls that were originally addressed to the station. The indicator can be included as part of the "ring" message, or can be provided as a separate message.

Figure 3A:
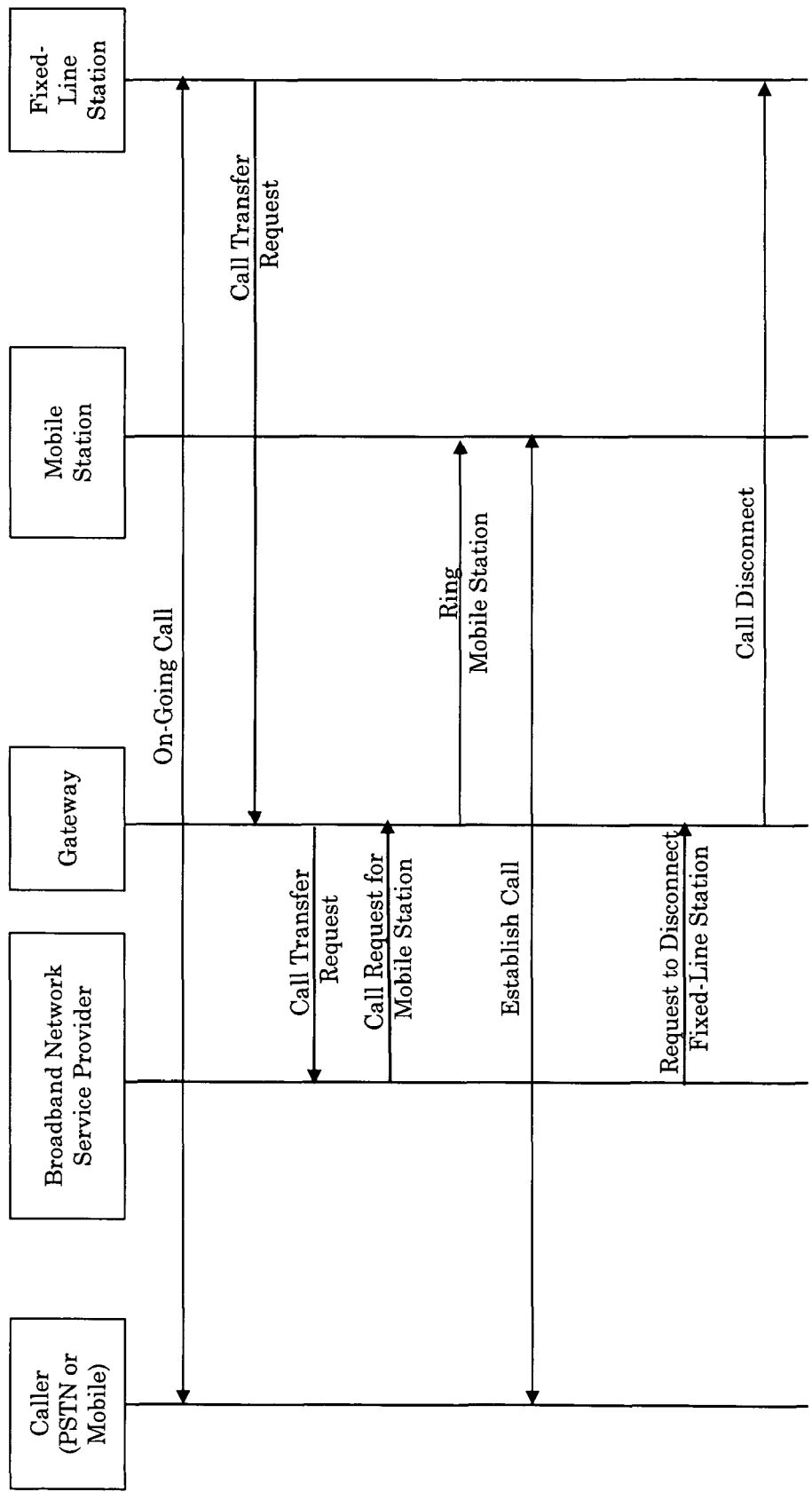
FIGS. 3a and 3b illustrate exemplary signaling diagrams of methods of transferring a call between a fixed-line station and a mobile station in accordance with the present invention.
Figure 3B:
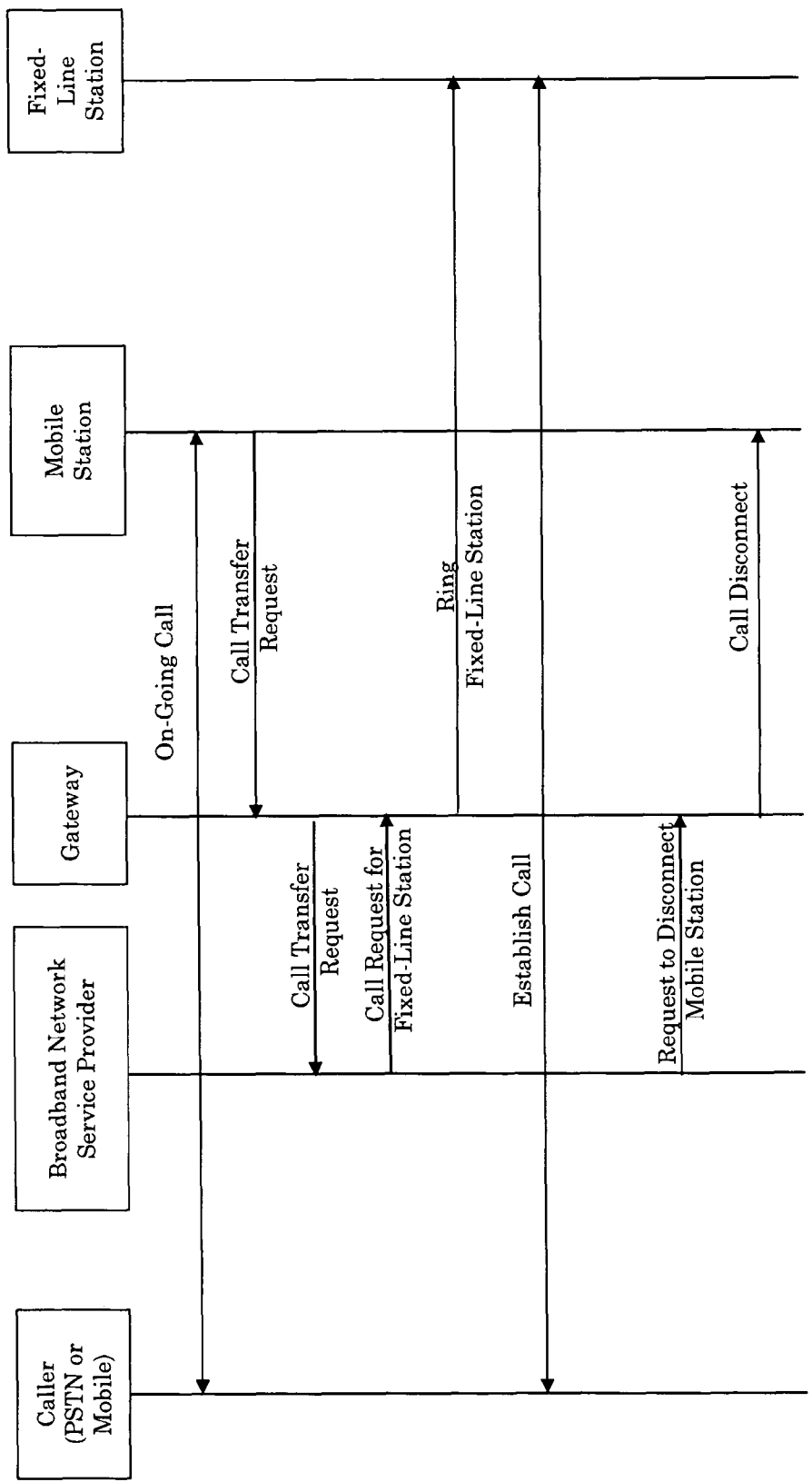

FIGS. 3a and 3b illustrate exemplary signaling diagrams of methods of transferring a call between a fixed-line station and a mobile station in accordance with the present invention. In both FIGS. 3a and 3b, the mobile station has registered with the gateway so that the wireless macro network updates the mobile station's location. In FIG. 3a the fixed-line station has an on-going call with a caller. The fixed-line station then sends a call transfer request to the gateway. The call transfer request can be sent in response to a user entering a service code into the fixed-line station, or the like. The call transfer request will identify the mobile station (which may be necessary if the gateway is supporting multiple mobile stations). The gateway then sends a call transfer request to the broadband network service provider, which places the call between the caller and the fixed-line station on hold, and then sends a call request for the mobile station to the gateway. The gateway then rings the mobile station, and when the mobile station goes "off-hook", the call is established between the mobile station and the caller. The broadband network service provider then sends a request to disconnect the fixed-line station to the gateway, which terminates the connection with the fixed-line station.

In FIG. 3b the mobile station is being supported by the gateway and has an on-going call with a caller. When the gateway receives a call transfer request from the mobile station, the gateway sends a call transfer request to the broadband network service provider. The broadband network service provider places the mobile station's on-going call on hold and sends a call request for the fixed-line station to the gateway, which sends a ringing message to the fixed-line station. When the fixed-line station goes "off-hook", the call is established between the caller and the fixed-line station. The broadband network service provider then sends a message to the gateway requesting it to disconnect the mobile station, and the gateway then sends a call disconnect message to the mobile station. Although FIG. 3b illustrates signaling to transfer a call from a mobile station to a fixed-line station, the signaling would be similar for transferring the call from a mobile station to another mobile station supported by the same gateway. The call transfer request message would identify the station to which the call should be transferred, and the broadband network service provider would send a call request for the appropriate station.

The distinctive ringing service can also be provided as part of the method illustrated in FIGS. 3a and 3b. Specifically, as part of the "ring" message, or in a separate message, an indication can be provided to the station that the incoming call is a call being transferred from another station.

Figure 4A:
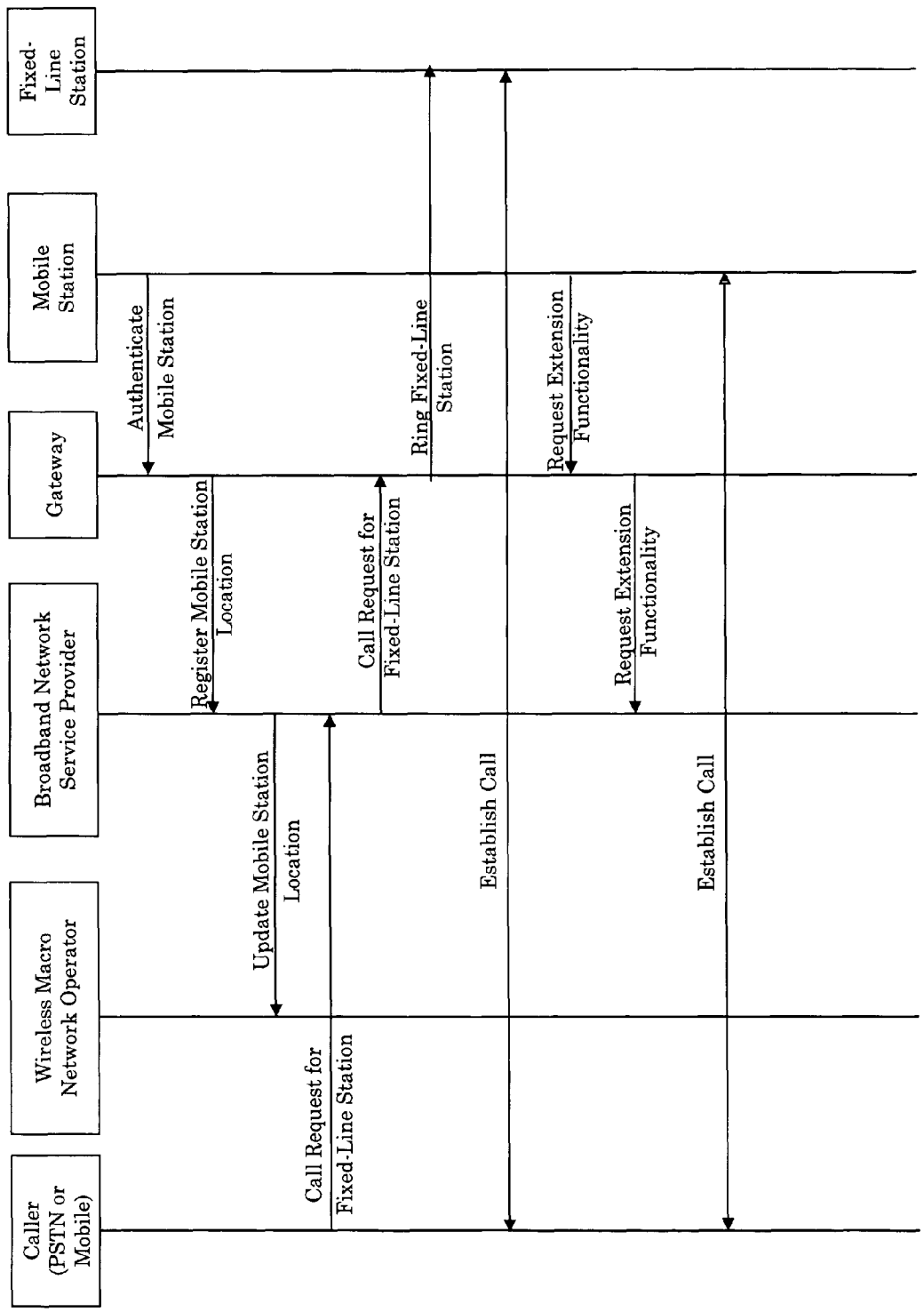
FIGS. 4a and 4b illustrate exemplary signaling diagrams for methods of providing extension functionality between a fixed-line station and a mobile station.
Figure 4B:
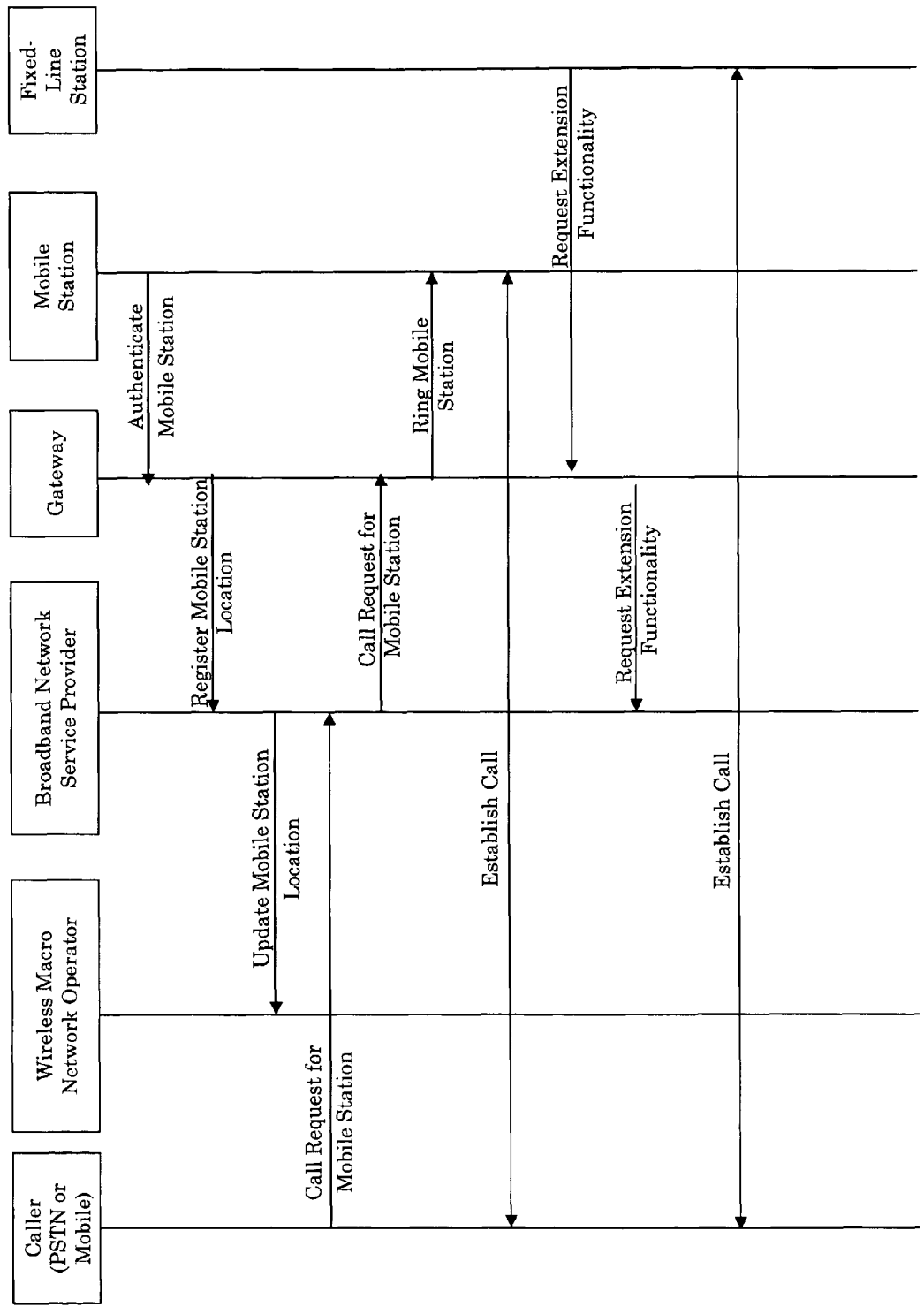

FIGS. 4a and 4b illustrate exemplary signaling diagrams for methods of providing extension functionality between a fixed-line station and a mobile station. Extension functionality is typically provided in conventional residential telephone systems where any telephone connected to the same telephone line can go "off-hook" and hear and talk on the same telephone call as another telephone on that same line. In FIG. 4a the mobile station is supported by the gateway and the fixed-line station has an established call. The mobile station sends a request for extension functionality to the gateway, which in turn sends the service request to the broadband network service provider. The broadband network service provider then establishes the call between the mobile station and the caller in such a way that the both the fixed-line station and the mobile station are on the same call. Accordingly, when the broadband network service provider receives voice or signaling information from the caller, this information will either be sent in separately addressed packets to the gateway for the mobile station and the fixed-line station, or the information can be sent in broadcast packets. When voice or signaling information is received from the fixed-line station, the broadband network service provider will send this information to both the caller and the mobile station. Similarly, when voice or signaling information is received from the mobile station, the broadband network service provider will send this information to both the caller and the fixed-line station.

In FIG. 4b the mobile station is supported by the gateway and has an established call. The fixed-line station sends a request for extension functionality to the gateway, which in turn sends the service request to the broadband network service provider. The broadband network service provider then establishes the call between the fixed-line station and the caller in such a way that the both the mobile station and the fixed-line station are on the same call. Accordingly, when the broadband network service provider receives voice or signaling information from the caller, this information will either be sent in separately addressed packets to the gateway for the mobile station and the fixed-line station, or the information can be sent in broadcast packets. When voice or signaling information is received from the fixed-line station, the broadband network service provider will send this information to both the caller and the mobile station. Similarly, when voice or signaling information is received from the mobile station, the broadband network service provider will send this information to both the caller and the fixed-line station. The signaling described above in connection with FIGS. 4a and 4b can also be used to support extension functionality between two or more mobile stations supported by the same gateway.

Figure 5:
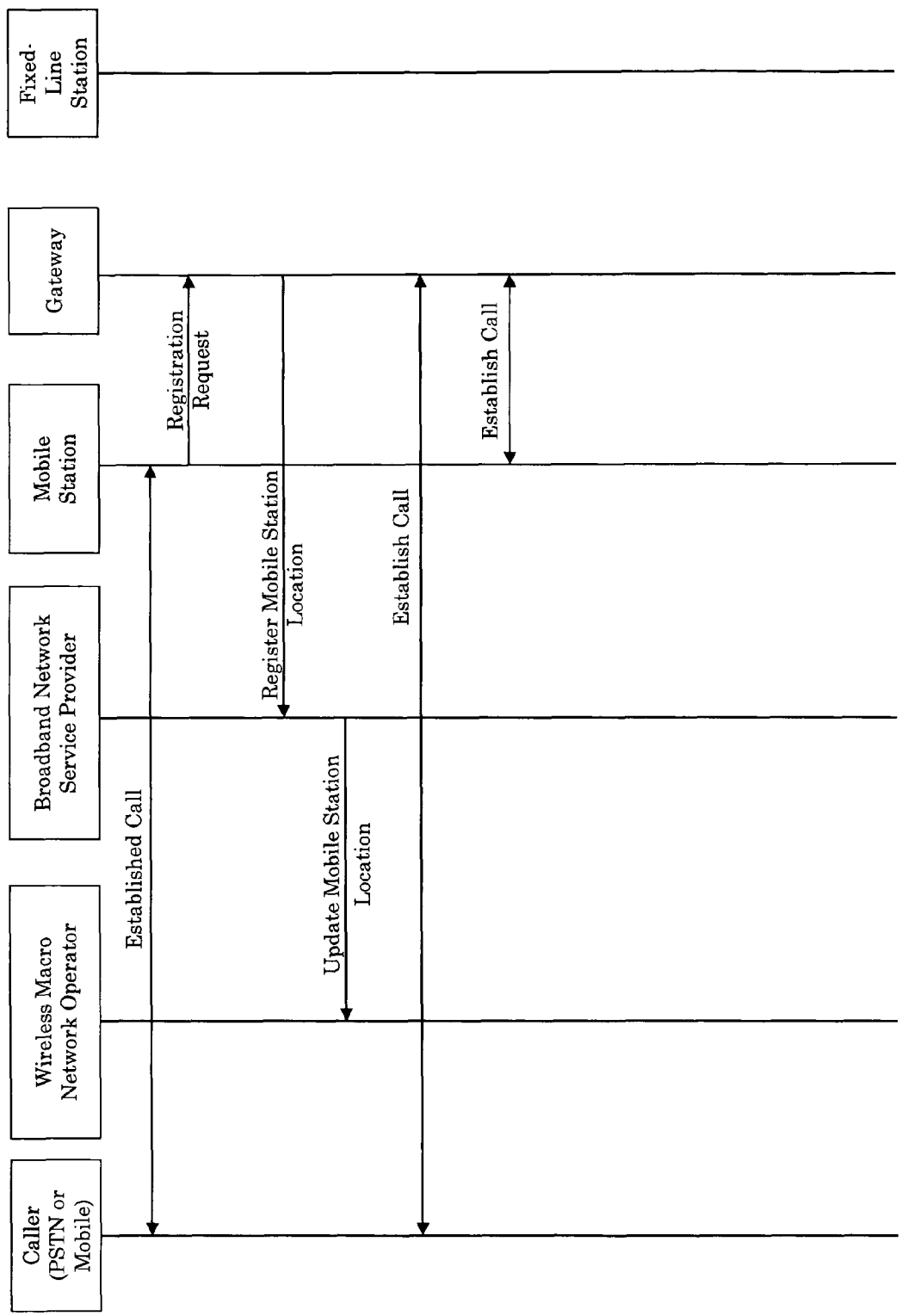
FIG. 5 illustrates an exemplary signaling diagram for a method of handoff of a ongoing telephone call from a wireless macro network to a private wireless network in accordance with the present invention.

FIG. 5 illustrates an exemplary signaling diagram for a method of handoff of a ongoing telephone call from a wireless macro network to a private wireless network in accordance with the present invention. When the mobile station has an established call supported directly with the wireless macro network, and the mobile station enters an area of the gateway, the mobile station sends a registration request to the gateway. The gateway sends the registration request to the broadband network service provider, which sends a message updating the mobile station's location. The wireless network operator then terminates the wireless macro network air-link and begins sending the voice and signaling information for the mobile station to the broadband network service provider, which then transmits this information to the mobile station via the gateway.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing call services, comprising the acts of:
   receiving, by a broadband network service provider's switch, a call request;
   determining that the call request is to be handled in accordance with a call service; and
   routing the call request to a mobile station and a fixed-line station in accordance with the call service,
   wherein the call service is a simultaneous call service, and the act of routing comprises the acts of
      routing a first call request to a residential gateway; and
      routing a second call request to the residential gateway.

2. The method of claim 1, wherein the call request is received by the switch with an address of the mobile station, and the call request is routed to the fixed-line station with a distinctive ring indication.

3. A method for providing call services, comprising the acts of:
   receiving, by a broadband network service provider's switch, a call request;
   determining that the call request is to be handled in accordance with a call service; and
   routing the call request to a mobile station and a fixed-line station in accordance with the call service,
   wherein the call service is a simultaneous call service, and the act of routing comprises the acts of
      routing a first call request to a residential gateway;
      routing a second call request to the residential gateway;
      receiving, by the residential gateway, the first and second call requests; and
      sending, by the residential gateway, an incoming call indication to the mobile station and the fixed-line station.

4. The method of claim 3, wherein the call request is for the fixed-line station.

5. The method of claim 3, wherein the call request is for a mobile station registered with a residential gateway.

6. The method of claim 3, wherein the call request is received by the switch with an address of the fixed-line station, and the call request is routed to the mobile station with a distinctive ring indication.

7. The method of claim 3, wherein the call request is received by the switch with an address of the mobile station, and the call request is routed to the fixed-line station with a distinctive ring indication 8. A method for providing call services, comprising the acts of:
   receiving, by a broadband network service provider's switch, a call request;
   determining that the call request is to be handled in accordance with a call service; and
   routing the call request to a mobile station and a fixed-line station in accordance with the call service,
   wherein the call service is a simultaneous call service, and the act of routing comprises the acts of
      routing a first call request to a residential gateway; and
      routing a second call request to the residential gateway, wherein the call request is received by the switch with an address of the fixed-line station, and the call request is routed to the mobile station with a distinctive ring indication.

* * * * *